United States Patent [19]

Johansson

[11] 4,280,363
[45] Jul. 28, 1981

[54] SYSTEM FOR MEASUREMENT OF FORCE WITH DIRECTIONALLY ORIENTATED STRAIN GAUGES

[76] Inventor: Kurt E. Johansson, Timmermansgatan 12, S-981 00 Kiruna, Sweden

[21] Appl. No.: 68,513

[22] Filed: Aug. 22, 1979

[30] Foreign Application Priority Data

Aug. 29, 1978 [SE] Sweden ............................... 7809077

[51] Int. Cl.³ .............................................. G01L 1/22
[52] U.S. Cl. .................................... 73/768; 73/862.65; 338/5
[58] Field of Search ................. 73/761, 768, 849, 855, 73/141 A, 781, 774; 338/2, 5, 226, 228, 229, 233–237

[56] References Cited

U.S. PATENT DOCUMENTS 2,925,576  2/1960  Wakeland et al. .................. 338/229
3,878,711  4/1975  Randolph .......................... 73/855 X
4,203,318  5/1980  Yorgiadis .......................... 73/141 A

FOREIGN PATENT DOCUMENTS 822445  11/1961  United Kingdom .
1395263  5/1975  United Kingdom .
1505526  3/1978  United Kingdom .

*Primary Examiner*—James J. Gill
*Attorney, Agent, or Firm*—Frishauf, Holtz, Goodman & Woodward

[57] ABSTRACT

A measuring shaft intended to be fixed in a hole is equipped with strain gauges or similar devices for sensing a load. The inner end of the measuring shaft is threaded to engage with threads provided in the bottom of the hole, and the outer end of the measuring shaft is fixed in relation to the hole so that the measuring shaft like a part unseparated from the walls of the hole but nevertheless detachable, accompanies the motions of the said walls.

15 Claims, 10 Drawing Figures

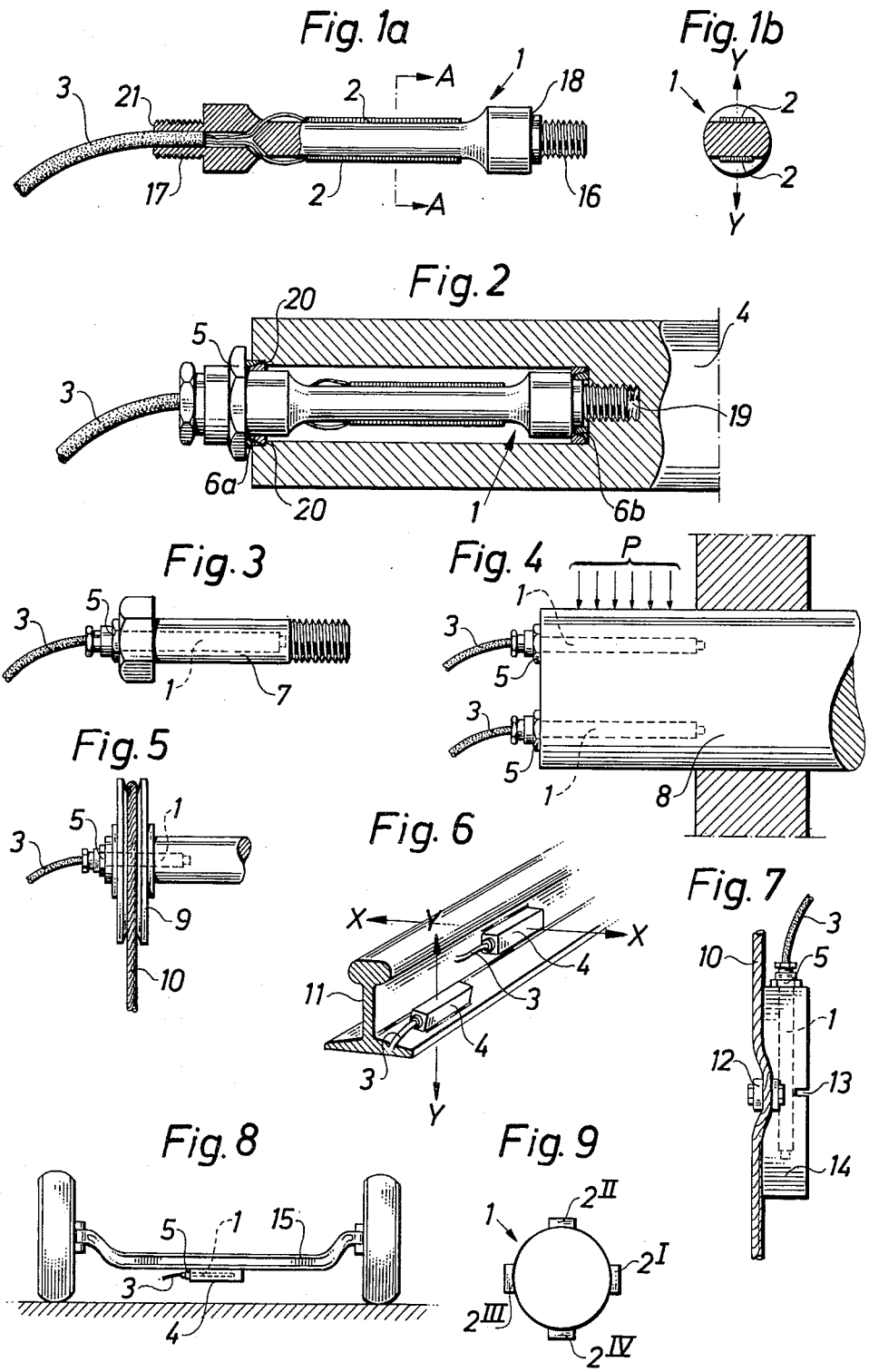

SYSTEM FOR MEASUREMENT OF FORCE WITH DIRECTIONALLY ORIENTATED STRAIN GAUGES

BACKGROUND OF THE INVENTION

This invention relates to a gauge device for installation in holes for indication of a load.

Several measuring devices for installation in holes, in for example shafts, are previously known, and are shown for example in U.S. Pat. Nos. 3,499,500; 3,554,025; 3,620,074; and 3,625,053. Also obtainable on the market is a magneto-elastic gauge which measures the bending of a shaft or a beam. Another prior art gauge is shown in British Pat. No. 1,433,133.

All prior art gauges, however, have the disadvantage that they are complicated to install, usually require large holes and are relatively expensive to manufacture and, moreover, can be used only in a relatively limited number of applications.

The object of the present invention is to provide a simple and inexpensive gauge device which can be easily installed largely anywhere with the aid of a manual drill. A further object of the invention is to be able to initially secure—for instance by welding—the sleeve of the gauge device without gauge units—strain gauges—and thereafter to install the measuring shaft with gauges. In certain applications, it is also advantageous if the measuring shaft can be made with small dimensions and if the measuring shaft can easily be replaced.

SUMMARY OF INVENTION

The device according to the present invention comprises a shaft so designed as to be insertable in a hole provided with a bottom, the inner and outer diameters of the shaft being arranged to be fixed both axially and radially relative to the walls of the hole. The inner end of the shaft is provided with threads, which are arranged to interact with threads provided in the bottom of the hole and the outer end of the shaft is fixed relative to the said hole so that the shaft, like a part unseparated from the walls of the hole, accompanies the movements of the walls of the hole, which depend on the load exerted on the walls of the hole. It is particularly advantageous if both ends of the shaft are provided with threads and if the inner shaft threads are so devised and located that they, upon relative turning of the shaft in relation to the hole via compression of coneshaped surfaces and thus expansion, fix the inner end of the shaft in the radial direction and if the outer end surface of the shaft is provided with the said connection lines, and the outer end of the shaft is arranged to be fixed centrally in the entry opening of the hole by means of tightening a threaded-on nut via compression of coneshaped surfaces.

BRIEF DESCRIPTION OF THE DRAWINGS

FIG. 1a shows a side view of the measuring shaft according to the invention,

FIG. 1b shows a section through the measuring shaft in the direction indicated by A—A in FIG. 1, FIG. 2 shows the measuring shaft mounted in an object the bending of which is to be measured, FIG. 3 shows the measuring shaft applied in a bolt, FIG. 4 shows several measuring shafts installed in a shaft with large dimensions, FIG. 5 shows the measuring shaft installed in the shaft of a pulley, FIG. 6 shows a rail section with a casing for measuring shafts according to the invention, FIG. 7 shows a rope force gauge with a measuring shaft according to the invention, FIG. 8 shows a casing equipped with a measuring hole installed on a wheel undercarriage for a vehicle and FIG. 9 shows a cross section through a gauge shaft, equipped with diametrically positioned gauges.

DETAILED DESCRIPTION

Shown in FIG. 1a is a measuring shaft 1, for instance of stainless steel, which is centrally turned or milled down so that recesses parallel to one another are formed, the said recesses being provided with glued-on or otherwise secured gauges 2, appropriately electric strain gauges. An electric cable 3 is connected to the gauges 2 and runs through holes out through the end of the measuring shaft 1. Both ends of the measuring shaft 1 are appropriately provided with threads 16, 17 and the inner end is also provided with a lug 18. Shown in FIG. 1B is a suitable embodiment in which the surfaces for attachment of the gauges 2 are made plane parallel. In this latter embodiment, maximum bend—and thus a maximum output signal from the gauges 2—is permitted only in one direction of force—Y—Y according to FIG. 1b.

FIG. 2 shows the measuring shaft according to FIG. 1 installed in a hole in an object 4, the bending of which is to be measured. Threaded portion 17 is provided with a marking 21 which is placed in a predetermined relationship to the direction in which the gauge units 2 are arranged to sense the load acting on the walls of the hole in the object 4. The measuring shaft 1 is installed in the following manner. Prior to installation, the inner threaded part between the threads 16 and the lug 18 of the measuring shaft 1 is fitted with two facing cone-shaped clamping rings 6b, which upon being squeezed have the ability to expand in the radial direction of the measuring shaft 1. After drilling of the hole for the measuring shaft 1 in object 4 and threading of the bottom section 19 of the hole, the measuring shaft 1 is screwed into the pre-drilled hole which is provided with a thread in its bottom section 19, whereupon the clamping rings 6b are clamped between the inner lug 18 on the measuring shaft 1 and the bottom section of the hole, causing the measuring shaft 1 to be fixed in the radial direction. The outer end of the measuring shaft 1 is preferably provided with equivalent cone-shaped clamping rings 6a, which by means of tightening of a fitted-on nut 5, expand in the radial direction of measuring shaft 1, thus causing clamping between the nut 5 and a recess 20 in the wall of the hole, and thus fixing the measuring shaft 1 also at its outer end. The nut 5 may also comprise a cable adapter.

In consequence of the simple installation of the measuring shaft 1, it is possible for the casing 4 (the measuring object) to be installed—welded on—before the measuring shaft 1 is installed, thus preventing welding heat, etc. from influencing the gauges 2. The compact dimensions of the measuring shaft imply that it is installable virtually anywhere where earlier, larger designs cannot be used. One example of this is shown in FIG. 3, in which the measuring shaft 1 is mounted in a bolt 7 to measure the bending stress in the bolt 7.

Illustrated in FIG. 4 is an expansion of the measuring facility with several measuring shafts 1 installed in a large shaft 8. The measuring shafts 1 can naturally be located with different measuring directions, thereby enabling forces in different directions in the large shaft 8 to be measured.

Shown in FIG. 5 is an application in which the measuring shaft 1 is installed in a shaft of a pulley 9 where it can, for example, also serve as an overload protector for hoists and similar lifting devices.

Shown in FIG. 6 is a rail section 11, which has been provided with a plurality of welded-on casings 4, which have been placed in different positions on the rail section in order to measure both horizontal and vertical forces in the section. The casings 4 have—naturally—been provided after welding with measuring shafts 1 with strain gauges.

Shown in FIG. 7 is a sketch of a pulley force gauge which utilizes the present invention. The casing 14 has in this case been provided with a hole in a similar manner as is indicated in connection with FIG. 2 and is provided with a measuring shaft 1 according to FIG. 1a. The casing 14 is also so fabricated such that the rope or wire 10 by means of clamp 12 bends the measuring shaft 1 in response to a pull on the wire 10. By means of a slot 13 in the casing, the bending of the casing 14 and thus of the measuring shaft 1 is amplified, resulting in a stronger output signal on the gauges 2.

Shown in FIG. 8 is a casing 4 which is welded to the wheel undercarriage 15 of a vehicle. The casing 4 is then fitted with a measuring shaft 1 according to FIG. 1a. Shown in FIG. 9 are crosswise positioned strain gauges $2^I$–$2^{IV}$ on a measuring shaft 1, enabling an electric output signal to be obtained from the gauges, the said output signal being independent of the direction of the load on the measuring shaft 1. This embodiment may be advantageous in the case of, for example, luffing cranes.

The invention is naturally not confined to applications according to the shown embodiments but may be applied virtually anywhere where it is desirable to be able to measure loads. Also, the locations of the gauges 2 on the measuring shaft 1 can be arranged in several different ways; for example two gauges can be placed diametrically opposite to each other or a pair of diametrically opposite gauges can be placed diametrically opposite to a second pair of diametrically opposite gauges so that a cross is formed—as is shown in FIG. 9—the implication being that the measuring shaft is then no longer directionally dependent but gives the same output signal regardless of how the force is applied.

The gauges 2 are naturally connected in turn to suitable amplification and indication members in order to clearly present the measured values. This, however, incorporates prior art technology and has therefore not been shown in detail.

I claim:

1. In a gauge device for indication of a load on an object by detecting bending stresses of said object, comprising:
   a shaft (1) fixable at both ends,
   at least one gauge unit (2) disposed on an outer surface of the shaft (1);
   electrical connection lines (3) coupled to the at least one gauge unit (2) and running out through the end of the shaft;
   the improvement wherein:
   the shaft (1) is releasably insertable in a hole in an object which is subjected to a load, said hole having a bottom and side walls which are subjected to a load to cause bending movements of said side walls, a clearance being provided between the portion of the shaft intermediate its ends and the side walls of the hole, the end of the shaft inserted first into the hole being the inner end and the opposite end being the outer end; and
   fixing means is provided at the inner and outer ends (16, 17, respectively) of the shaft to releasably fix said inner and outer shaft ends both axially and radially relative to the walls of the hole, said fixing means at the inner end of the shaft comprising threads (16) which are arranged to engage with threads provided in the bottom of the hole, said fixing means at the outer end of the shaft including means fixedly coupling the outer end of the shaft to the walls of the hole so that the shaft, like a part unseparated from the walls of the hole, accompanies said walls in their bending movements, which are due to a load on the walls of the hole.

2. The device of claim 1 wherein both the inner and outer ends of the shaft (1) are provided with threads (16, 17).

3. The device of claim 2, wherein the fixing means at the inner shaft end further comprises facing cone-shaped surfaces (6b) between said inner shaft and at least a portion of the wall or bottom of said hole such that in response to relative turning of the shaft (1) in relation to the hole, the cone-shaped surfaces compress in the axial direction of the shaft and radially expand to thereby fix the inner end of the shaft (1) in the radial direction.

4. The device of claim 3 wherein the inner threads of the shaft (1) are terminated with a lug (18) against which said cone-shaped surface are arranged to bear; and wherein the threads formed in the bottom of the hole have a smaller diameter than the rest of the hole.

5. The device of claim 4 wherein said cone-shaped surfaces comprise cone-shaped clamping rings.

6. The device of any one of claims 1, 2 or 3 wherein the outer end surface of the shaft (1) is provided with said connection lines (3).

7. The device of either of claims 2 or 3, wherein the fixing means at the outer end of the shaft comprises a nut (5) threaded on the threaded outer end of the shaft; and second facing cone-shaped surfaces adjacent the nut so that turning of the nut relative to the shaft compresses the second facing cone-shaped surfaces in the axial direction of the shaft and thereby radially expands the second cone-shaped surfaces against the walls of the hole to thereby fix the shaft centrally in the entry opening of the hole.

8. The device of claim 7 wherein said hole has a recess at the outer end thereof for receiving said second cone-shaped surfaces.

9. The device of claim 8 wherein said second cone-shaped surfaces comprise second cone-shaped clamping rings.

10. The device of claim 7 wherein the outer end surface of the shaft (1) is provided with said connection lines (3).

11. The device of any one of claims 1, 2 or 3 wherein the outer end of the shaft (1) is provided with a marking (21) which is placed in a predetermined relationship to the direction in which the gauge units (2) are arranged to sense the load acting on the walls of the hole.

12. The device of any one of claims 1, 2 or 3 wherein the gauge units (2) are fixed on mutually parallel surfaces of the shaft (1).

13. The device of claim 12 wherein said shaft has mutually parallel plane surfaces on which the gauge units (2) are fixed.

14. The device of claim 1 wherein the shaft has a reduced cross-sectional area intermediate its ends on which the gauge units (2) are fixed.

15. The device of any one of claims 1, 2 or 3 wherein the gauge units are strain gauges.

* * * * *